United States Patent [19]

Funahashi et al.

[11] Patent Number: 4,928,500
[45] Date of Patent: May 29, 1990

[54] CONTROL DEVICE FOR FREEZER

[75] Inventors: Nobuhiro Funahashi; Toshio Yamashita; Hiroshi Ogawa, all of Aichi, Japan

[73] Assignee: Mitsubishi Jukogyo Kabushiki Kaisha, Tokyo, Japan

[21] Appl. No.: 190,476

[22] Filed: May 5, 1988

[30] Foreign Application Priority Data

May 7, 1987 [JP] Japan .................................. 62-67430

[51] Int. Cl.$^5$ .............................................. F25B 49/00
[52] U.S. Cl. ...................................... 62/193; 62/129; 62/158; 62/231
[58] Field of Search ................. 62/192, 193, 157, 158, 62/231, 228.1, 126, 127, 129, 161, 163; 361/22, 71, 72, 73, 74

[56] References Cited

U.S. PATENT DOCUMENTS

| 3,298,192 | 1/1967 | Morgan | 62/158 |
| 3,312,081 | 4/1967 | Berger et al. | 62/158 |
| 3,599,439 | 8/1971 | Lewis | 361/22 X |
| 4,653,285 | 3/1987 | Pohl | 361/22 X |

Primary Examiner—Harry B. Tanner
Attorney, Agent, or Firm—Birch, Stewart, Kolasch & Birch

[57] ABSTRACT

A control device for a freezer in which a compressor whose operation has been stopped due to low lubricating oil pressure may be automatically restarted. This control device eliminates manual restarting of the compressor repeatedly until it becomes fully operational and facilitates discovery of the true malfunctioning of lubrication mechanisms for bearings in freezer compressors, by prohibiting automatic restarting once the compressor has been operating at normal oil pressure for a preset amount of time.

4 Claims, 9 Drawing Sheets

| FIG. 7A |
| FIG. 7B | FIG. 7C |

CONTROL DEVICE FOR FREEZER

FIELD OF THE INVENTION

The present invention relates to a control device for freezers which comes into action when abnormal oil pressure is detected in a compressor of a freezer.

There exist known compressors for freezers in which a built-in pump supplies lubricating oil to bearings or the like for better lubrication of the bearings. When the pressure supplying such lubricating oil (called "oil pressure" hereinafter) goes down below a certain value in these compressors, the intended lubrication effect often fails to be achieved. In some extreme cases the bearings become damaged. It is therefore common for a compressor to have a control device for stopping its operation when the oil pressure drops below a predetermined value in order to avoid damage.

Figure 1:
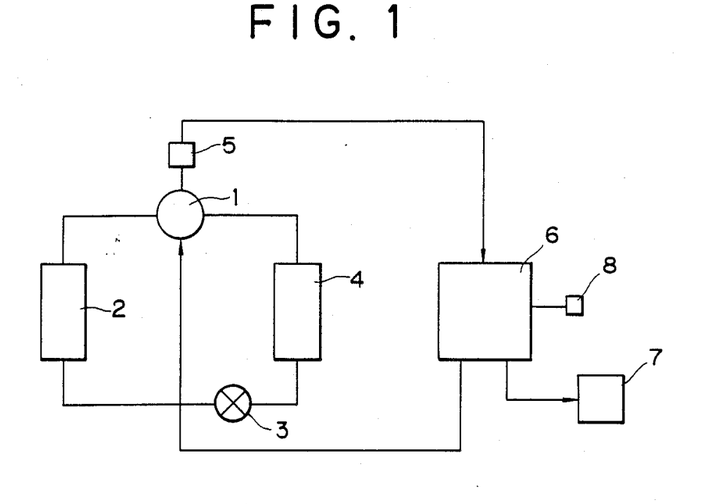
FIG. 1 is a block diagram of an example of a conventional control device for freezers.

FIG. 1 shows an example of such control device for freezers, wherein a control device 6 sends signals to start a compressor 1 and cause an operational condition indicator 7 display an appropriate signal, and process signals from an oil pressure sensor 5 and a reset switch 8.

In FIG. 1, the compressor 1 starts its operation upon receiving a signal from the control device 6. A coolant gas which is hot and under high pressure enters a condenser 2 and is cooled to become liquified there, passing to a valve 3. There the coolant is released from high pressure, absorbs heat from the surroundings in an evaporator 4 and becomes vaporized. Then, it completes a freezing cycle by returning to the compressor 1. Also, in this example, the oil pressure generated by the operation of the compressor 1 is checked with an oil pressure sensor 5, and signals from this sensor are transmitted to the control device 6. Subsequently, the control device 6 decides if such signals agree with preset conditions for oil pressure abnormalities.

Figure 2:
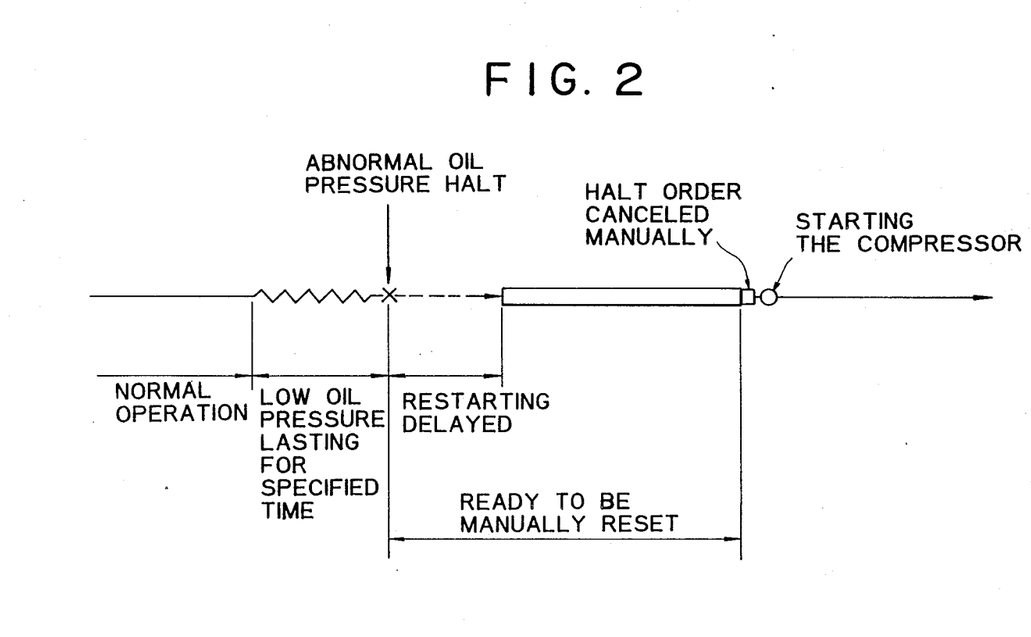
FIG. 2 is a graph which shows how a conventional control device for a freezer works in sequence.
Figure 4:
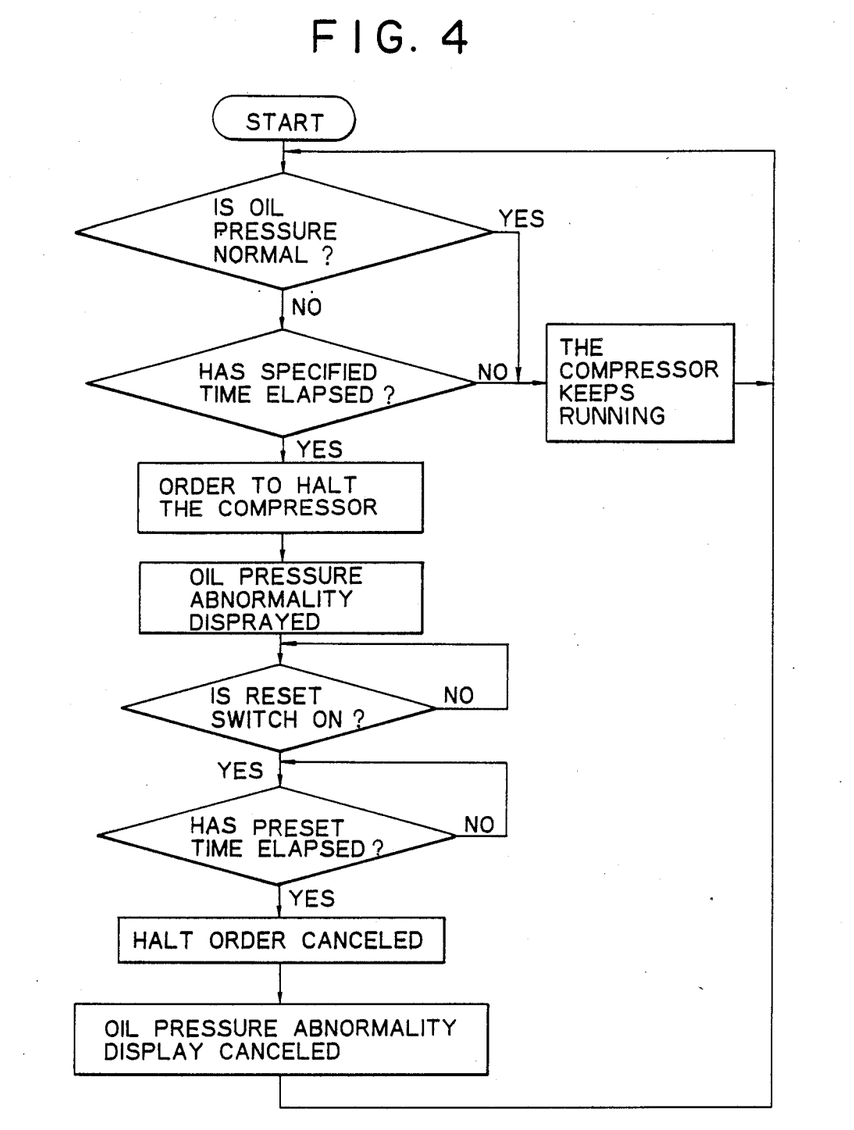

An example of such decision and ensuring processes is shown in FIGS. 2 and 4 as a block diagram and as a flow chart, respectively. In the example of FIG. 1, when the compressor 1 keeps running under pressures below a predetermined value for a specified period of time it is decided that an oil pressure abnormality has taken place, and signals are sent to stop the compressor and to cause the operational condition indicator to indicate such a condition. On the other hand, if the oil pressure is above the predetermined value the compressor 1 is kept running.

During the time that the compressor 1 is stopped because of the detected abnormal oil pressure, if the manual reset switch 8 is actuated the control device 6 terminates the stop signal after waiting for a period of time that is long enough to let the bearings cool off. Then, the compressor 1 resumes its operation. At the same time, a signal is sent to the operational condition indicator 7 to cancel the display of an oil pressure abnormality. In the present case, if the manual reset switch is not actuated by someone during this stoppage due to abnormal oil pressure, the compressor 1 will not restart.

Figure 3:
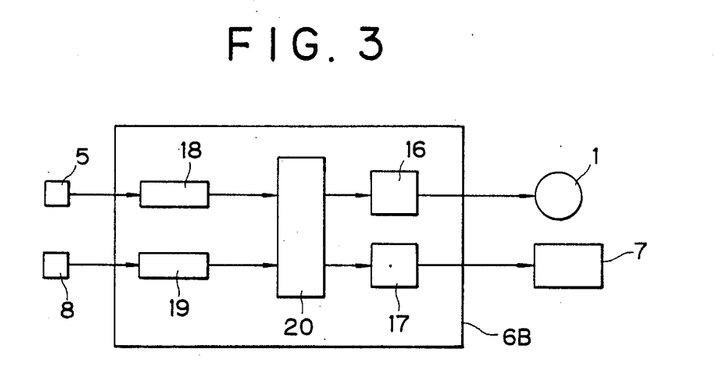
FIGS. 3 and 4 are a functional block diagram and a flow chart of a conventional control device for freezers, respectively.

FIG. 3 is a functional block diagram of a conventional control device for freezers: 16 denotes a controller for giving operation orders to a compressor, 17 a controller for giving operational orders to an operational condition indicator, 18 a detector for judging oil pressure abnormalities, 19 a reset circuit for resetting the operation which has stopped due to oil pressure abnormalities, 20 a control circuit, and 6B a control device.

Generally speaking, when a compressor is started, especially after it has been left unoperated at low temperatures for a long period of time, a coolant in a crank case of the compressor vaporizes rapidly and foams because of a sudden pressure drop which follows the startup of the compressor. This causes an insufficient supply of oil to a pump and the oil pressure becomes temporarily low. In such a case, if the operation is left as it is, the oil pressure usually returns to normal, and the compressor can be kept running without any ill effects. In the above conventional oil pressure protection device, however, it has been necessary to actuate a manual reset switch repeatedly upon startup until the compressor shows no abnormal oil pressure and can continue its operation. This has caused a great inconvenience to an operator.

Also, even if the operational condition indicator is displaying a stoppage condition due to abnormal oil pressure, it has been difficult to ascertain whether it is because of a temporary oil pressure drop or due to real malfunctioning in the lubrication mechanisms. This judgment has had to be made by repeating the manual resetting to check the lubrication mechanisms and has been troublesome to determine.

OBJECT AND SUMMARY OF THE INVENTION

It is an object of the present invention to provide a control device for freezers that makes it easy to determine malfunctioning of lubrication mechanisms in order to solve the above problems.

A control device for freezers of the present invention comprises an oil pressure sensor and sends an order to halt the operation of a compressor as soon as the control device judges that an oil pressure abnormality has occurred when the oil pressure becomes low during the operation of the compressor, and is characterized in that the control device further comprises a means for automatically canceling the above halt order to the compressor when the abnormal oil pressure drop satisfies certain conditions.

According to the present invention, when a compressor is halted because of abnormal oil pressure, an abnormal oil pressure counter, for example, is incremented. Then, the control device of the present invention checks if the current value of the counter is less than a preset value. If it is so then after a given period of time the abnormal oil pressure stoppage of the compressor is canceled (automatic resetting) and the compressor resumes its operation. If the oil pressure does not return to a normal value after a specified period of time following the restart, the automatic resetting is repeated for the preset number of times until the value in the counter has reached the preset value. Also, even if the number of times the automatic resetting is activated is less than the preset value, when normal oil pressure lasts longer than a preset period of time the subsequent automatic resetting becomes prohibited because any temporary abnormal oil pressure has been corrected. Therefore, it is now possible to judge that the stoppage has been due to malfunctioning of lubrication mechanisms from the beginning, instead of temporary oil pressure abnormalities, by the discontinuation of the automatic resetting at the preset value of the abnormal oil pressure counter. Also, when lubrication mechanisms malfunction after completion of a startup operation the automatic resetting does not take place and the compressor has to be

DETAILED DESCRIPTION OF THE PREFERRED EMBODIMENT

Figure 5:
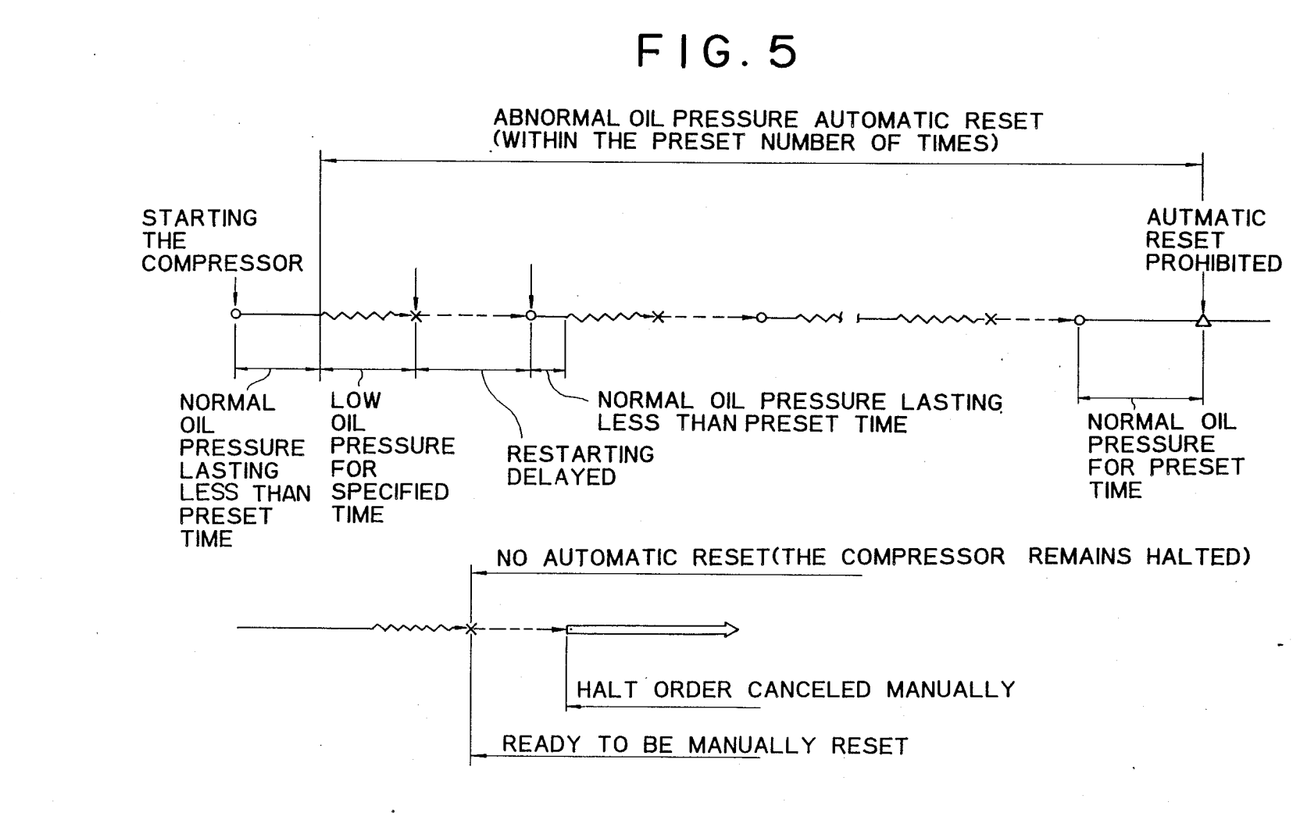
FIG. 5 is a graph which shows how an embodiment of the present invention works in sequence.
Figure 6:
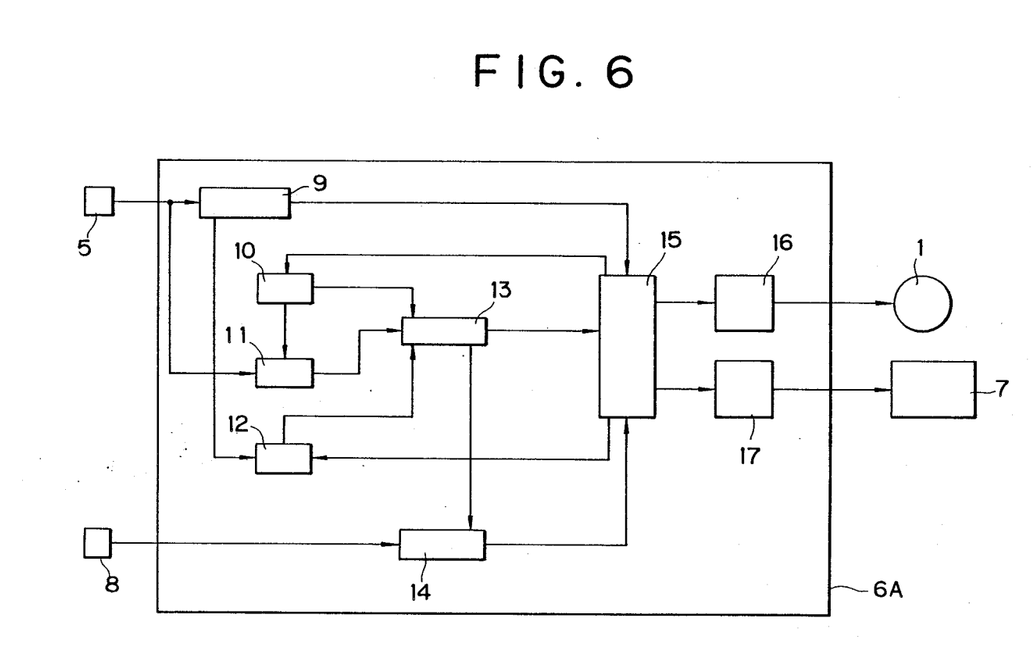
FIG. 6 is a functional block diagram of an embodiment of the present invention.
Figure 7:
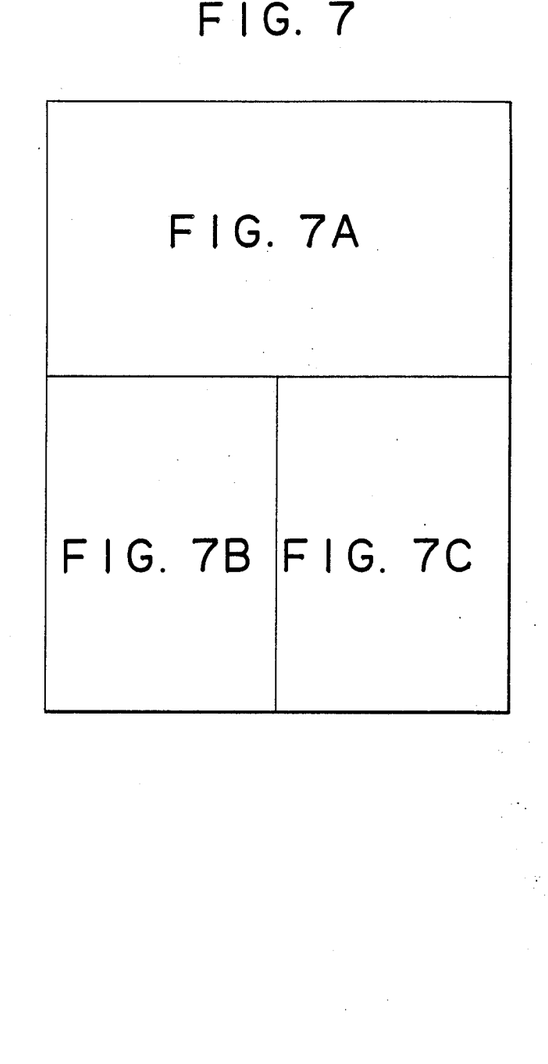
FIG. 7 is a flow chart showing how an embodiment of the present invention functions, which consists of FIG. 7A, 7B and 7C.
Figure 7A:
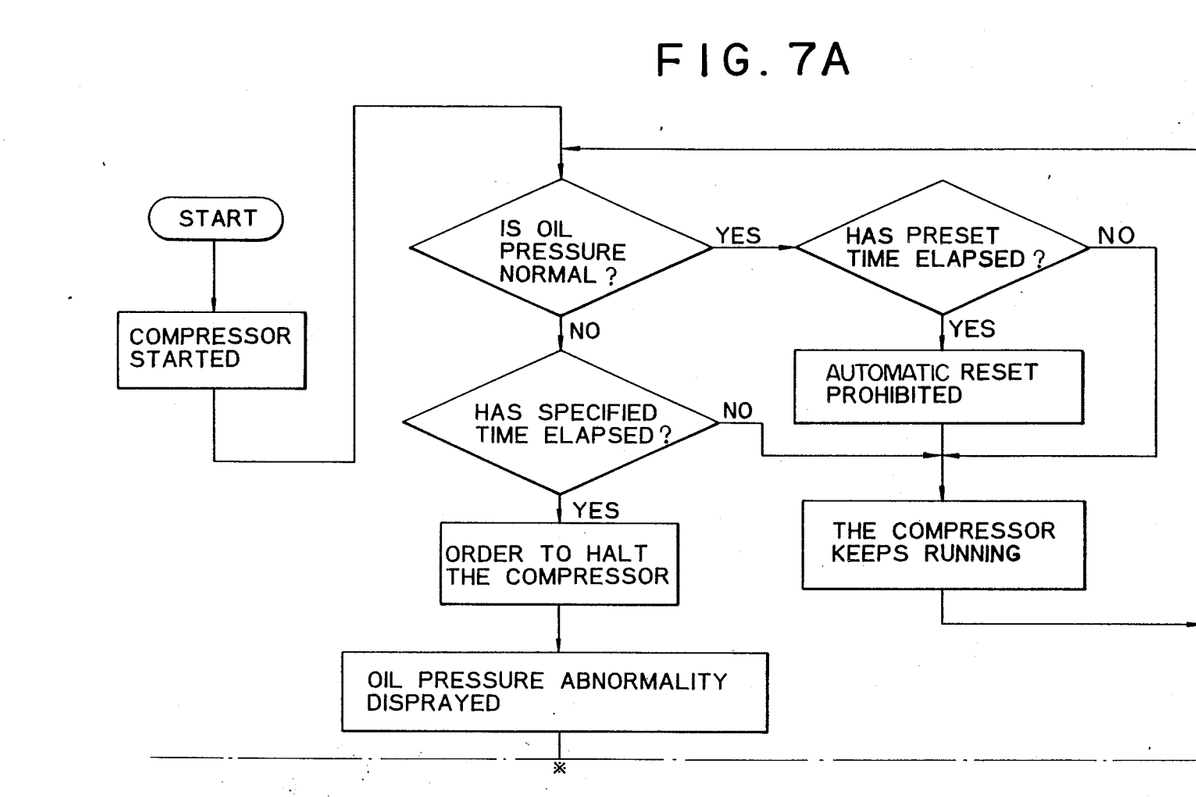
Figure 7B:
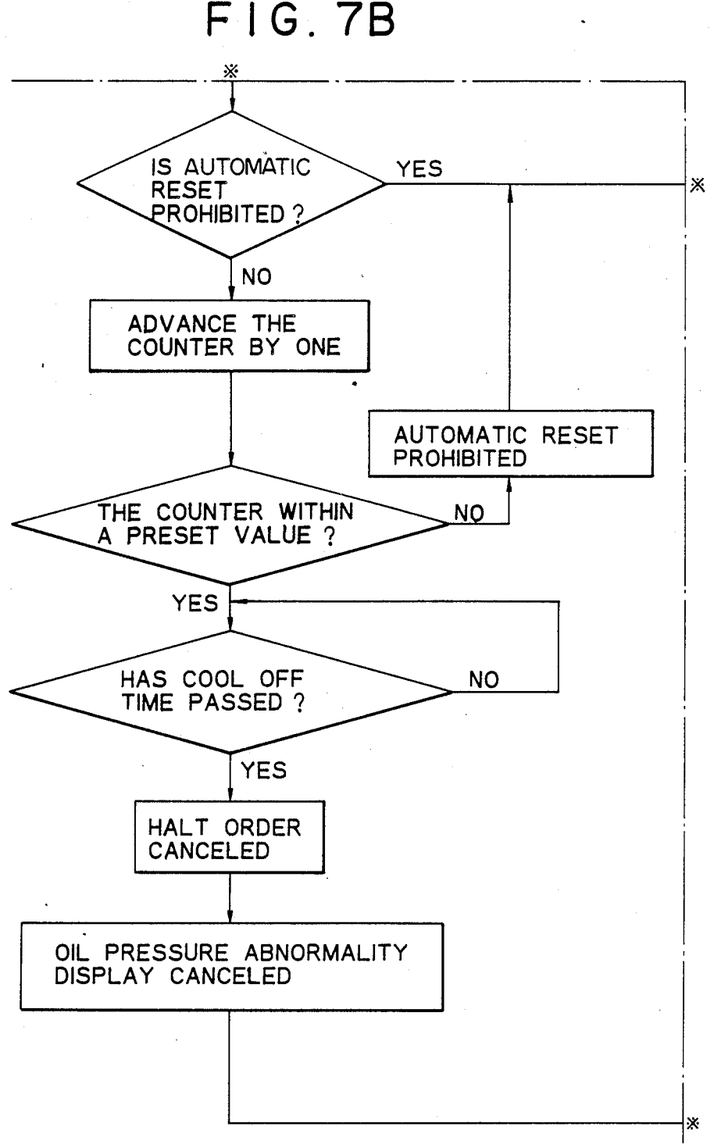
Figure 7C:
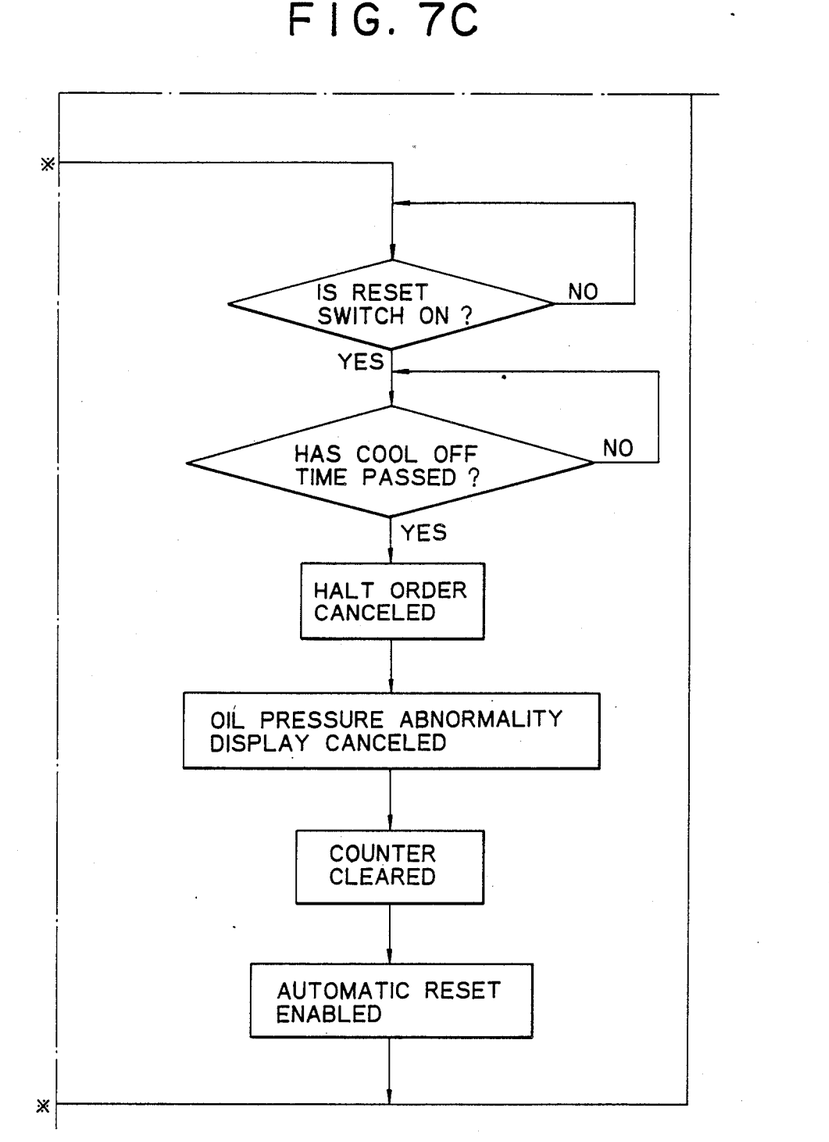

FIG. 5 shows how an embodiment of the present invention works sequentially. FIG. 6 is a functional block diagram of an embodiment of the present invention in which 9 denotes a sensor for judging oil pressure abnormalities, 10 a timer for measuring the time passed after a compressor is started, 11 a timer for measuring the time during which the oil pressure is normal, 12 a counter for counting the number of times oil pressure abnormalities are detected, 13 a judging circuit for deciding if automatic resetting should be initiated, 14 a judging circuit for cancellation of abnormal oil pressure compressor stoppage, 15 a control circuit, 16 a controller for giving orders to the compressor, 17 a controller for sending commands to an indicator, and 6A a control device which is similar to the control device for freezers shown in FIG. 1 (except that 6 for the control device in FIG. 1 should be replaced by 6A here) and is constructed in such a way that a freezing cycle is performed and signals from a sensor of the generated oil pressure are transmitted to this control device 6A.

In FIG. 6 control device 6A gives an order to a compressor 1 for starting its operation. Subsequently, it is judged as an oil pressure abnormality at the beginning of operation when the period of time during which normal oil pressure is maintained is shorter than a preset period which is usually long enough for the stable start-up of a freezer, and automatic resetting (automatic restarting of the compressor) becomes possible. After the automatic restarting of the compressor, if the oil pressure is lower than a preset value for the specified period of time again it is judged as an oil pressure abnormality, and orders are given to the compressor 1 to halt its operation and to an operational condition indicator to indicate such a condition. Then, when the compressor 1 is halted because of this oil pressure abnormality, an abnormal oil pressure counter is advanced by one and the value of the counter is compared to a preset value. If the counter value is less than the preset value, after the period of time that is considered to be long enough, for example, for bearings and the like to cool off the abnormal oil pressure stoppage of the compressor 1 is automatically canceled (automatic resetting), and the operation of the compressor is restarted. At the same time an order is given to the operational condition indicator 7 to cancel the display of abnormal oil pressure. This automatic resetting is repeated up to the preset number of times if the time during which normal oil pressure is maintained is shorter than a preset period of time. Also, even if the number of times the automatic resetting has been initiated is less than the preset value, if the duration of normal oil pressure becomes longer than the preset period, the automatic resetting becomes prohibited thereafter since a temporary oil pressure abnormality has been corrected.

Therefore, in the case in which lubrication mechanisms are malfunctioning from the start, the malfunctioning becomes clear since the automatic resetting is discontinued at the preset number of times. Also, if the lubrication mechanisms start malfunctioning during operation the compressor remains halted and waits for manual resetting since the abnormal oil pressure is detected after normal oil pressure has been maintained longer than the preset period of time and the automatic resetting has therefore been prohibited. Thus, it is easy to find causes of abnormal oil pressures.

After normal oil pressure was maintained for a preset period of time or the automatic resetting was tried for a preset number of times, if an oil pressure abnormality is detected, since the automatic resetting has been prohibited, the operation is to be restarted with a manual reset switch 8. In this case, after the manual reset switch 8 is actuated the operation of the compressor 1 is started as soon as the period of time for cooling off elapses as above. At the same time, the operational condition indicator 7 is ordered to cancel its display of abnormal oil pressure, the abnormal oil pressure counter is cleared to zero, and the automatic resetting is made possible again.

In the embodiment of the present invention described above, the number of times the automatic resetting is to be repeated and the period of time during which normal oil pressure is to be maintained are both restricted. However, it is also possible to restrict only the period of time for normal oil pressure or only the number of times for the automatic resetting. Also, the display during an oil pressure abnormality is the same whether the automatic resetting is ordered or the manual resetting is required in the above embodiment, but these distinctions can be displayed for an operator's convenience.

In addition, the manual resetting may be made possible even during the automatic resetting so that the number of times the automatic resetting is repeated can be increased at an operator's will. Furthermore, the manual reset switch 8 may be removed so that only the automatic resetting may be performed. When the automatic resetting becomes prohibited in this case the power switch of the control device 6A may be turned off and turned on again to reset the control device 6A to the initial condition and, therefore, to restart the compressor 1.

According to the present invention, it becomes possible to avoid troublesome repetition reset procedures manually in response to temporary malfunctioning of lubrication mechanisms which appears during initial compressor startup, and it becomes easy to find true faults in the lubrication mechanisms, which are some of the major advantages of the present invention.

What is claimed is:

1. A control device for a freezer, comprising:
an oil pressure sensor for sensing the oil pressure of a compressor used in said freezer and developing an oil pressure signal representative thereof;
means for comparing said oil pressure signal with a reference value, determining the oil pressure to be abnormal if said oil pressure signal is less than said reference value, and developing an abnormality signal in response to said determination;

means responsive to said abnormality signal for halting the operation of said compressor;

resetting means responsive to the halting of said compressor for restarting the operation of said compressor after a predetermined cool-off period has elapsed;

means for measuring the amount of time during continuous operation of said compressor that said abnormality signal is not developed and producing a preset time signal when said amount of time reaches a preset time; and means responsive to said preset time signal for preventing said resetting means from restarting the operation of said compressor.

2. A control device as defined in claim 1, wherein said means for halting comprises means for delaying the halting of said compressor until said abnormality signal has existed for a specified period of time.

3. A control device as defined in claim 1, further comprising counter means for counting the number of times that said compressor is halted and preventing said resetting means from restarting the operation of said compressor after counting a preset number of halt operations.

4. A control device for a freezer as claimed in any of claims 1 to 3 further comprising an operational condition indicator means for displaying an abnormal stoppage condition when said compressor stops due to an oil pressure abnormality, said display being canceled when said compressor is restarted.

* * * * *